Patented Jan. 26, 1954

2,667,503

UNITED STATES PATENT OFFICE 2,667,503

METHOD OF PREPARING ORTHO SULFONYL CHLORIDE BENZOIC ACID ESTERS

Oliver F. Senn, Toledo, Ohio, assignor, by mesne assignments, to Maumee Development Company, Toledo, Ohio, a corporation of Ohio No Drawing. Application July 27, 1951, Serial No. 239,006

2 Claims. (Cl. 260—470)

This invention relates to the preparation of ortho sulfonyl chloride benzoic acid esters, and has for an object the provision of a novel, improved and simplified process, useful in the manufacture of saccharin, resulting in marked improvement in the characteristics of the product.

Saccharin has heretofore been prepared by the Remsen-Fahlberg process. This process involves the sulfonation of toluene, conversion of the mixture of ortho and para sulfonic acids to the corresponding sulfonyl chlorides, separation of the ortho and para toluene sulfonyl chlorides, conversion of the latter to the corresponding sulfonamide, and oxidation of the sulfonamide to saccharin. This chain of reactions is necessarily subject to side reactions, which produce impurities in the finished saccharin, causing a bitter after taste.

The present invention is based upon a different series of reactions, which have the advantage of being cleancut, involving no difficultly separable isomers or side reactions. The resultant saccharin does not have the bitter after taste, which has previously retarded its acceptance as a flavoring material and a sugar substitute.

In the practice of the invention, an ester of 2,2'-dicarboxy-diphenyl-disulfide (dithiosalicylic acid), which may be prepared as described in the application for U. S. Letters Patent by George F. Schlaudecker, Serial No. 239,007, filed concurrently herewith, is oxidized by suspending it in cold water and passing in chlorine under controlled conditions, while agitating the suspension. The chlorine is absorbed rapidly, and the particles of suspended ester become covered with pale yellow to white solid ester of ortho sulfonyl chloride benzoic acid. When the rate of chlorine absorption becomes slow, the chlorine supply is cut off, the suspended material filtered off, or separated by centrifuging or otherwise, and stirred with ammonium hydroxide. An exothermic reaction begins at once and is complete within 10 to 15 minutes. At the end of that time the sulfonyl chloride ester has been converted to the ammonium salt of saccharin, which is in solution, and the unconverted ester of 2,2'-dicarboxy-diphenyl-disulfide which is in suspension may be returned for further oxidation with chlorine. The reaction may be represented as follows:

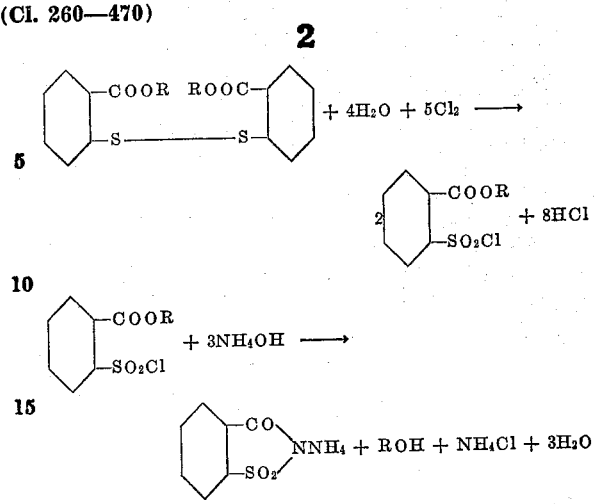

The ammonium salt of saccharin may be then processed in the usual way to produce the insoluble form of saccharin, or the sodium salt of saccharin, which are two forms in commercial use. The details of this step are not important and form no part of the instant invention.

This method of producing saccharin has many advantages over former processes. The reactions are rapid and overall yields are excellent. The use of expensive oxidizing agents, such as potassium permanganate, is avoided. The principal advantage, however, lies in avoiding side reactions which cause losses in yield, and impurities which lower the quality of the saccharin produced. Saccharin produced by this new method has been demonstrated, by panel testing under clinical control, to be definitely superior in flavor to saccharin produced by other methods. It has been possible to prepare diets flavored with this new type of saccharin which were readily accepted by diabetic patients, while the same diets, when flavored with saccharin produced by other methods, were found to have an objectionable bitter taste.

In the practice of my improved method, I prefer to employ as the starting material the dimethyl ester of 2,2'-dicarboxy-diphenyl-disulfide, although acceptable saccharin, having the same greatly improved properties, is derived from other esters, such as isopropyl, isobutyl, n-butyl, and iso-amyl. The use of these and other materials produced by esterifying dithiosalicylic acid with any monohydric alcohol, and more especially with alcohols having less than 8 carbon atoms in the molecule, is contemplated as within the scope of my invention.

The dimethyl ester has been customarily employed because it is the least expensive to prepare and because its melting point of 135° C. is high enough to permit easy recovery from the warm solution of ammonium saccharin formed in the final step of the reaction. When esters of lower melting point are employed it is necessary to cool the ammonium saccharin solution below the melting point of the ester employed, to permit ready filtration and recovery of the unused ester. While this is no bar to the use of low melting point esters, it does entail additional processing expense.

In order to obtain acceptable yields by this method, I have found it necessary to maintain the temperature of the aqueous slurry of the ester of 2,2'-dicarboxy-diphenyl-disulfide below 40° C. If the temperature is permitted to rise above this limit, some saccharin will be obtained, but considerable hydrolysis of the sulfonyl chloride occurs, which diminishes the yield. At 60° C. hydrolysis is extensive; although some saccharin is still obtained, the yield is very poor.

The practice of the invention is described in detail in the following example, which is illustrative merely, and not intended as limiting the scope of the invention.

*Example 1.*—One part of the dimethyl ester of 2,2'-dicarboxy-diphenyl-disulfide is suspended in three parts of water. The temperature of the slurry is maintained below 40° C. by suitable refrigeration, or by the direct addition of ice, while chlorine is passed into the slurry, with or without agitation, and is absorbed, with the formation of a pale yellow to white flocculent slurry of the methyl ester of ortho sulfonyl chloride benzoic acid. When the chlorine absorption slows down or ceases, the chlorine supply is cut off, and the slurry is filtered and washed with water. The residue is then mixed with 1.5 parts of an aqueous 28% ammonium hydroxide solution. An exothermic reaction begins at once and is complete in 15 minutes or less. The solution then contains the saccharin as the ammonium salt, and the unreacted ester is then filtered off and may be put in the next batch. The ammonium saccharin solution may be treated by the usual methods to prepare the insoluble or soluble forms of saccharin of commerce.

The same procedure may be followed when substituting isopropyl, isobutyl, n-butyl and isoamyl esters of 2,2'-dicarboxy-diphenyl-disulfide for the dimethyl ester of the foregoing example, or when esters of other monohydric alcohols with dithiosalicylic acid are used. Cooling of the ammonium solution of the saccharin may be required with esters of lower melting point to facilitate filtration. Thus a suspension of solid particles of unreacted ester is filtered more readily than a suspension consisting largely of oily droplets.

Having thus described the invention, what is claimed as new and desired to be secured by Letters Patent is:

1. In a method for preparing ortho sulfonyl chloride benzoic acid esters, the steps which comprise intimately contacting an aqueous suspension of an ester of 2,2'-dicarboxy-diphenyl-disulfide with a monohydroxy alcohol having less than 8 carbon atoms in the molecule, at a temperature below 40° C. with chlorine until reaction to form the sulfonyl chloride is substantially complete, and separating the suspended reaction product.

2. The method of claim 1 in which the ester of 2,2'-dicarboxy-diphenyl-disulphide is the dimethyl ester.

OLIVER F. SENN.

References Cited in the file of this patent

UNITED STATES PATENTS

| Number | Name | Date |
|---|---|---|
| 1,769,423 | Eder | July 1, 1930 |
| 2,174,856 | Johnson | Oct. 3, 1939 |
| 2,277,325 | Hueter | Mar. 24, 1942 |

FOREIGN PATENTS

| Number | Country | Date |
|---|---|---|
| 12,585 | Great Britain | Aug. 18, 1900 |

OTHER REFERENCES

Houben, Die Methoden Der Org. Chem. (3rd), vol. 2, p. 196 (1943).

Swan et al., Report P. B. 901 (1945) 22 pp.